United States Patent
Prasadh et al.

(10) Patent No.: US 9,900,260 B2
(45) Date of Patent: Feb. 20, 2018

(54) EFFICIENT SUPPORT FOR VARIABLE WIDTH DATA CHANNELS IN AN INTERCONNECT NETWORK

(71) Applicant: ARM Limited, Cambridge (GB)

(72) Inventors: Ramamoorthy Guru Prasadh, Austin, TX (US); Jamshed Jalal, Austin, TX (US); Ashok Kumar Tummala, Cedar Park, TX (US); Phanindra Kumar Mannava, Austin, TX (US); Tushar P. Ringe, Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/965,237

(22) Filed: Dec. 10, 2015

(65) Prior Publication Data

US 2017/0171095 A1    Jun. 15, 2017

(51) Int. Cl.
| | |
|---|---|
| *H04L 12/891* | (2013.01) |
| *H04L 12/26* | (2006.01) |
| *H04L 12/835* | (2013.01) |
| *H04L 29/06* | (2006.01) |

(52) U.S. Cl.
CPC ............ *H04L 47/41* (2013.01); *H04L 43/106* (2013.01); *H04L 43/16* (2013.01); *H04L 47/30* (2013.01); *H04L 69/18* (2013.01)

(58) Field of Classification Search
CPC ....... H04L 47/41; H04L 43/106; H04L 69/18; H04L 43/16; H04L 47/30
See application file for complete search history.

(56) References Cited

U.S. PATENT DOCUMENTS

| | | |
|---|---|---|
| 5,966,729 A | 10/1999 | Phelps |
| 6,519,685 B1 | 2/2003 | Chang |
| 6,546,447 B1 | 4/2003 | Buckland et al. |
| 6,598,123 B1 | 7/2003 | Anderson |
| 6,799,252 B1 | 9/2004 | Bauman |
| 6,810,467 B1 | 10/2004 | Khare |
| 6,868,481 B1 | 3/2005 | Gaither |
| 7,117,311 B1 | 10/2006 | Rankin |

(Continued)

OTHER PUBLICATIONS

A. Moshovos, G. Memik, B. Falsafi and A. Choudhary, "JETTY: filtering snoops for reduced energy consumption in SMP servers," Proceedings HPCA Seventh International Symposium on High-Performance Computer Architecture, Monterrey, 2001, pp. 85-96.

*Primary Examiner* — Mohammad Anwar
(74) *Attorney, Agent, or Firm* — Leveque IP Law, P.C.

(57) ABSTRACT

A bridging circuit and method of operation thereof, which couples first and second electronic circuits of a data processing system. The first electronic circuit generates signals corresponding to digits of a flow control unit (flit) of a first flow control protocol and where the second electronic circuit is responsive to signals corresponding to flits of a second flow control protocol. When first flits are destined for the same target buffer, they are combined to provide a second flit consistent with the second flow control protocol and transmitting the second flit to the second electronic circuit. The second flit includes data and metadata fields copied from the first flits, a common field common to each of the first flits, a merged field containing a merger of fields from the first flits and a validity field indicating which portions of the second flit contain valid data.

20 Claims, 6 Drawing Sheets

(56) References Cited

U.S. PATENT DOCUMENTS

| | | |
|---|---|---|
| 7,117,312 B1 | 10/2006 | Cypher |
| 7,240,165 B2 | 7/2007 | Tierney |
| 7,325,102 B1 | 1/2008 | Cypher |
| 7,613,882 B1 | 11/2009 | Akkawi |
| 7,685,409 B2 | 3/2010 | Du |
| 7,698,509 B1 | 4/2010 | Koster |
| 7,836,144 B2 | 11/2010 | Mannava |
| 7,925,840 B2 | 4/2011 | Harris et al. |
| 7,937,535 B2 | 5/2011 | Ozer |
| 8,392,665 B2 | 3/2013 | Moga et al. |
| 8,423,736 B2 | 4/2013 | Blake |
| 8,638,789 B1 | 1/2014 | Pani |
| 8,935,485 B2 | 1/2015 | Jalal |
| 9,058,272 B1 | 6/2015 | O'Bleness et al. |
| 9,166,936 B1* | 10/2015 | Stovall ................ H04L 51/063 |
| 9,507,716 B2 | 11/2016 | Salisbury |
| 2002/0087811 A1 | 7/2002 | Khare et al. |
| 2003/0070016 A1 | 4/2003 | Jones et al. |
| 2003/0131202 A1 | 7/2003 | Khare |
| 2003/0163649 A1 | 8/2003 | Kapur |
| 2003/0167367 A1 | 9/2003 | Kaushik |
| 2004/0003184 A1 | 1/2004 | Safranek |
| 2004/0117561 A1 | 6/2004 | Quach |
| 2005/0005073 A1 | 1/2005 | Pruvost et al. |
| 2005/0201383 A1 | 9/2005 | Bhandari et al. |
| 2006/0080508 A1 | 4/2006 | Hoover et al. |
| 2006/0080512 A1 | 4/2006 | Hoover et al. |
| 2006/0224835 A1 | 10/2006 | Blumrich et al. |
| 2006/0224836 A1 | 10/2006 | Blumrich et al. |
| 2006/0224838 A1 | 10/2006 | Blumrich |
| 2006/0224840 A1 | 10/2006 | Blumrich et al. |
| 2007/0005899 A1 | 1/2007 | Sistla |
| 2007/0073879 A1 | 3/2007 | Overby |
| 2007/0079044 A1 | 4/2007 | Mandal et al. |
| 2007/0186054 A1 | 8/2007 | Kruckemyer |
| 2007/0239941 A1 | 11/2007 | Looi |
| 2008/0005485 A1 | 1/2008 | Gilbert |
| 2008/0005486 A1 | 1/2008 | Mannava et al. |
| 2008/0209133 A1 | 8/2008 | Ozer et al. |
| 2008/0243739 A1 | 10/2008 | Tsien |
| 2009/0158022 A1 | 6/2009 | Radhakrishnan et al. |
| 2009/0300289 A1 | 12/2009 | Kurts |
| 2012/0099475 A1* | 4/2012 | Tokuoka ............. H04L 12/5696 370/253 |
| 2012/0144064 A1* | 6/2012 | Parker ..................... H04L 45/04 709/241 |
| 2013/0042070 A1 | 2/2013 | Jalal |
| 2013/0042078 A1 | 2/2013 | Jalal et al. |
| 2013/0051391 A1* | 2/2013 | Jayasimha ............. H04L 45/60 370/392 |
| 2014/0032853 A1 | 1/2014 | Lih |
| 2014/0095801 A1 | 4/2014 | Bodas et al. |
| 2014/0095806 A1 | 4/2014 | Fajardo |
| 2014/0095808 A1 | 4/2014 | Moll et al. |
| 2014/0189239 A1 | 7/2014 | Hum |
| 2014/0281180 A1 | 9/2014 | Tune |
| 2014/0372696 A1 | 12/2014 | Tune et al. |
| 2015/0074357 A1 | 3/2015 | McDonald et al. |
| 2015/0095544 A1 | 4/2015 | Debendra |
| 2015/0103822 A1* | 4/2015 | Gianchandani ..... G06F 15/7825 370/389 |
| 2015/0324288 A1 | 11/2015 | Rowlands |
| 2016/0041936 A1 | 2/2016 | Lee et al. |
| 2016/0055085 A1 | 2/2016 | Salisbury et al. |
| 2016/0062889 A1 | 3/2016 | Salisbury |
| 2016/0062890 A1 | 3/2016 | Salisbury |
| 2016/0062893 A1 | 3/2016 | Tune et al. |
| 2016/0117249 A1 | 4/2016 | Lin et al. |
| 2016/0147661 A1 | 5/2016 | Ambroladze |
| 2016/0147662 A1 | 5/2016 | Drapala |
| 2016/0188471 A1 | 6/2016 | Forrest et al. |
| 2016/0210231 A1 | 7/2016 | Huang et al. |
| 2016/0283375 A1* | 9/2016 | Das Sharma ......... G06F 12/084 |
| 2017/0168939 A1 | 6/2017 | Jalal et al. |
| 2017/0185515 A1 | 6/2017 | Fahim et al. |

\* cited by examiner

EFFICIENT SUPPORT FOR VARIABLE WIDTH DATA CHANNELS IN AN INTERCONNECT NETWORK

BACKGROUND

An integrated circuit may contain a number of functional blocks or devices, such as processing cores, memories and peripherals, for example, that are interconnected to enable data to be transferred during operation. Simpler circuits may communicate via one or more shared bus structures. More complex integrated circuits, such as System-on-Chip (SoC) circuits and circuits having multiple processing cores, for example, may transport data using a dedicated interconnect structure such as a bus or network.

In order to facilitate modular design, in which functional blocks are reused, the properties of the communication structure may be defined by standard bus protocols, such as the Advanced Microcontroller Bus Architecture (AMBA™) of ARM Limited.

To cope with increasing complexity, an integrated circuit with multiple functional blocks may be configured as an interconnect network to enable efficient communication between functional blocks. Data flows around the networks in groups of digits called 'flits', which abbreviates the terms Flow Control Units or Flow Control Digits. Each flit includes a payload together with information to control its flow through the network.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In accordance with certain representative embodiments of the present disclosure, there is provided a method of operation of a bridging circuit coupled between a first electronic circuit and second electronic circuit, where the first electronic circuit generates signals corresponding to digits of a flow control unit (flit) of a first flow control protocol and where the second electronic circuit is responsive to signals corresponding to digits of a flow control unit (flit) of a second flow control protocol. The bridging circuit and the first and second electronic circuits may constitute parts of an on-chip network of interconnected devices, where a flit is the basic unit for information flow control through the network.

The bridging circuit may be part of an interface between first and second electronic circuits of a multi-chip network of interconnected devices.

The flits enable transactions to be performed between master and slave logic units coupled via an interconnect circuit. Each transaction may consist of an address transfer from a master logic unit to a slave logic unit, and one or more data transfers between the master logic unit and that slave logic unit. For a write transaction these data transfers will pass from the master logic unit to the slave logic unit, while for a read transaction these data transfers will pass from the slave logic unit to the master logic unit.

While the description below refers to combining flits of one protocol into flits of another protocol and vice versa, the approach has application to other data units. For example, an information packet may be split into a number of components for transporting around a network. These components may be combined in a similar manner to the flit combination described herein. Accordingly, the term 'flit' as used herein should be taken to mean any component of an information packet.

In certain embodiments, the first electronic circuit may be a master logic unit such as processor core, or a slave logic unit such as a memory controller or other peripheral. The second electronic circuit may comprise an interconnect circuit, for example.

An interconnect circuit may be designed to meet a specification. For example, protocols such as the AMBA 5 Coherent Hub Interface (ABMA 5 CHI™) protocol define an interface between functional blocks and an interconnect circuit. This enables functional blocks, such as master and slave logic units, to be designed and tested in a modular manner.

An interconnect network may be configured to use a layered protocol. For example, an interconnect network may include physical, link, routing and protocol layers.

The physical layer includes the actual wiring of the network, the associated transmitters and receivers, and the lowest-level logic that transmits and receives the physical-layer unit. The physical layer may include one or more parallel data channels. The width of a data channel may be, for example, 32, 64 or 128 bits. The unit of transfer at the physical layer is termed a physical unit or 'phit'. The physical layer may transmit a phit at a single clock edge.

A link layer implements flow control. Data flows around the networks in group of digits called 'flits', which abbreviates the terms Flow Control Units or Flow Control Digits. Flits are communicated as one or more phits. The link layer is responsible for sending and receiving flits. Each flit is sent to the physical layer as a one or more phits. Each flit may contain error correction codes to enable flits to be resent if necessary. The link layer may implement a flow control scheme to prevent the receiver's buffer from overflowing.

A network or routing layer sends a packet consisting of a header and a payload. The header typically contains the destination and the message type. When the routing layer receives a unit it examines its routing tables to determine if the unit has reached its destination. If so, it is delivered to the next-higher layer. If not, it is sent on.

A protocol layer, such as a cache coherent protocol, sends and receives packets between functional blocks or devices. A packet may include data from a memory cache row for example. The protocol layer may also send and receive cache coherency messages in order to maintain cache coherency.

A particular network may contain functional blocks that implement different data channel widths or use flits of different sizes. In such networks, bridging may be required.

In certain embodiments, when first flits received on two or more consecutive data beats from the first electronic circuit and are destined for the same target buffer, the first flits are combined to form a third flit consistent with the second flow control protocol. The third flit is then passed to the second electronic circuit, where it is transported to the target buffer. The third flit is structured according to a second flow control protocol and may include, for example, a data field and a metadata field (parity, error detection codes, error correction codes, etc.) copied from the first flits, together with a merged field that includes elements such as a data identifier (dataID) field indicative of the position of the flit within a packet, an error field (RespErr) indicative of an error in any of the first flits. In addition, the third flit may include a control field, indicative of the target buffer for the third flit, and a validity field indicating which fields of the third flit contain valid data.

Figure 1A:
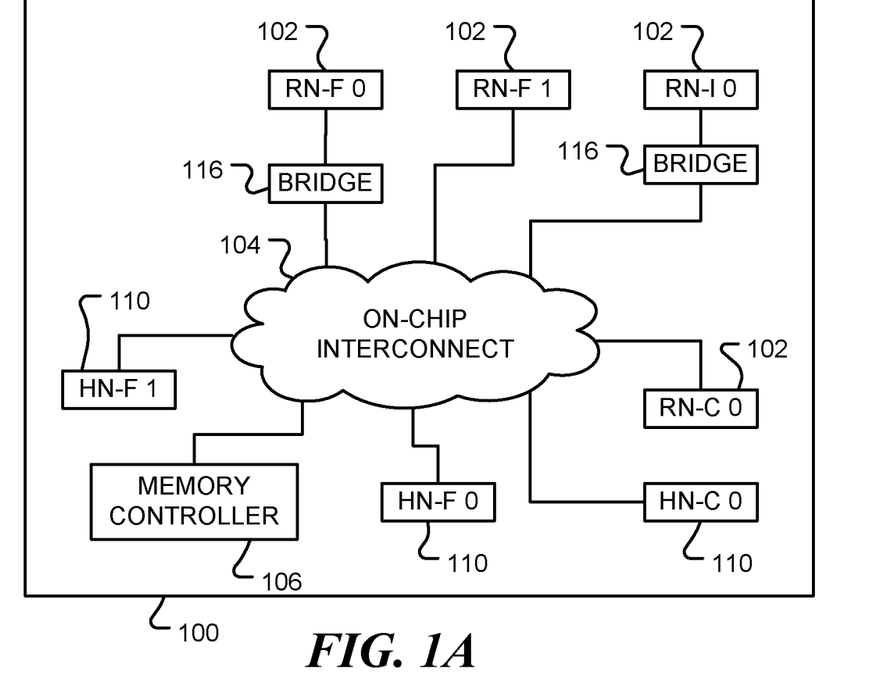
FIG. 1A is a block diagram of a network, in accordance with various representative embodiments.

FIG. 1A illustrates a block diagram of a network 100, in accordance with various representative embodiments. The network 100 may be implemented in a System-on-a-Chip (SoC) integrated circuit, for example. In the simplified example shown, the network 100 includes one or more devices 102, such as processing cores, clusters of processing cores, or other devices (such as a graphics post processor (GPP), a digital signal processor (DSP), a field programmable gate array (FPGA) or an application specific integrated circuit (ASIC) device), that are coupled via interconnect circuit 104, to data resources such as shared memory 106, input/output devices, via nodes 110. Devices 102 generate data access requests and are referred herein as request nodes (RN's). Devices 110 are referred to herein as home nodes (HN's). When multiple RN's share a data or memory resource, a coherent protocol may be used, and devices may be referred to as fully coherent (e.g. RN-F and HN-F) or I/O coherent (e.g. RN-I). Other devices may provide connections to another integrated circuit (e.g. RN-C and HN-C). Note that many elements of a SoC, such as clocks for example, have been omitted in FIG. 1A for the sake of clarity.

Figure 1B:
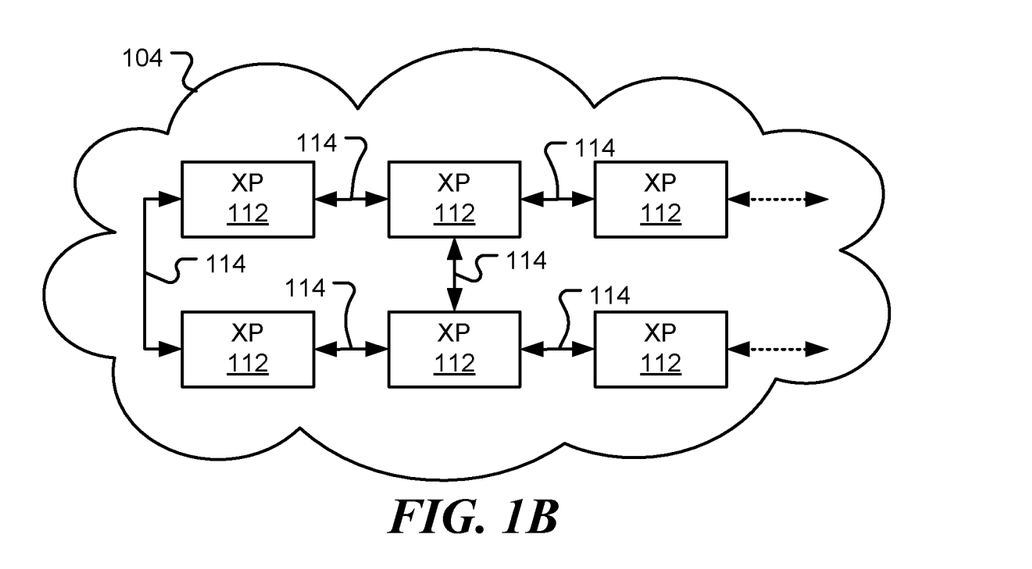
FIG. 1B is a block diagram of a network interconnect circuit, in accordance with various representative embodiments.

FIG. 1B is a block diagram of a network interconnect circuit 104 in accordance with various representative embodiments. The interconnect circuit 104 includes a number of connection points 112 connected by data links 114. The data links provide physical channels over which data is passed between the connection points 112. The connection points include switches that control signal flow between the interconnected devices.

The network may include additional linked switches that do not couple directly to any device. The switches may be linked in various topologies. For example, each switch may be directly linked to every other switch to form a fully-connected network, or the switches may be partially connected to form a ring, a mesh, a hypercube, a tree, a star or other topology. A ring network, for example, simplifies routing of messages and requires circuitry, while a fully connected network minimizes the number of switch hops that a message must make to pass from source to destination.

In the example illustrated, all of the switches are connection points. The data links 114 may be bi-directional and may include multiple channels for data transfer or for control messages. The network may include any number of connection points 112.

The links 114 provide the physical layer of the network and provide the actual wiring plus the lowest-level logic that transmits and receives the physical-layer unit. The unit of transfer at the physical layer is termed a physical unit or 'phit'. The physical layer may transmit a phit at a single clock edge, for example.

Commonly, a message to be communicated via a network is split into one or more information packets. Each packet contains a header that indicates the destination of the packet and information as to how the packet is to be reassembled on receipt to recover the message.

Routing of the packets through the network occurs at the Network or Routing layer. Each connection point 112 includes a switch to enable routing of packets. In a bi-directional ring network, for example, routing may be simply the choice of forwarding the packet to the next connection point in the ring or passing it to a device coupled to the connection point.

In the Data Link layer, information may be transferred between switches using a variety of techniques. In packet switching, for example, a complete packet is received and buffered at a switch before being forwarded. This may require an unnecessarily large amount of storage. In addition, for networks where multiple hops are required, this increases the packet latency (the time it takes for a message to traverse the network).

An alternative approach is to use 'cut-through' packet switching, where the allocation of a physical resource, such as the output connection from a switch, is made once the packet header is received, but prior to receipt of the complete packet. In this approach, there is no need to wait for, or buffer, the complete packet at the switch, so packet latency and switch buffer requirements are reduced. In this approach, flow control (e.g. the granting of the output resource) is performed at the packet level.

A variation on this approach, sometimes termed 'wormhole' switching, splits each packet into one or more smaller units or sub-packets, called 'flits' or 'frames', upon which flow control is performed. The term 'flit' is an abbreviation of 'flow control unit' or 'flow unit' or 'flow control digit', for example. Commonly, the flits are sized such that a flit can contain at least the packet header. Flits from a single packet may occupy a number of switches. Flits may be buffered within the switch to prevent premature saturation of the network if a packet blocks in the network. Buffering allows the links to be time-multiplexed at the flit level to create a set of virtual channels.

Thus, in an on-chip network, a 'packet' is the meaningful unit of the upper-layer protocol, such as the cache-coherence protocol, while a "flit" is the smallest unit of flow control maintained by the network. Generally, a packet consists of one or more number of flits, so if the packet size is larger than one flit, then the packet is split into multiple flits.

In a multichip module, a network may have links to other chips in the module.

A flit is communicated in the physical channel as one or more 'phits' or physical units, where the size of a 'phit' corresponds to the width (in bits) of the physical channel. In some applications the terms flit and phit have the same meaning and both structures are of equal size.

Many very large scale integrated (VLSI) circuits are configured in a modular manner, in which previously designed and tested functional circuit blocks (sometimes referred to as Intellectual Property (IP) blocks) are linked together to form larger circuits. To facilitate this, common interfaces have been defined. For example, the interconnect circuit 104 may have one or more defined interfaces to facilitate coupling to devices. In particular, the interface with the interconnect circuit may be defined to allow the communication of flow control digits (flits) between the device circuit and the interconnect circuit.

To facilitate interconnect between devices with differing interfaces, a bridging circuit, such as 116 in FIG. 1A, may be provided. In accordance with certain aspects of the disclosure, a bridging circuit is provided to enable variable width data transactions to be processed efficiently in an interconnect network, leading to improved data performance.

Figure 2:
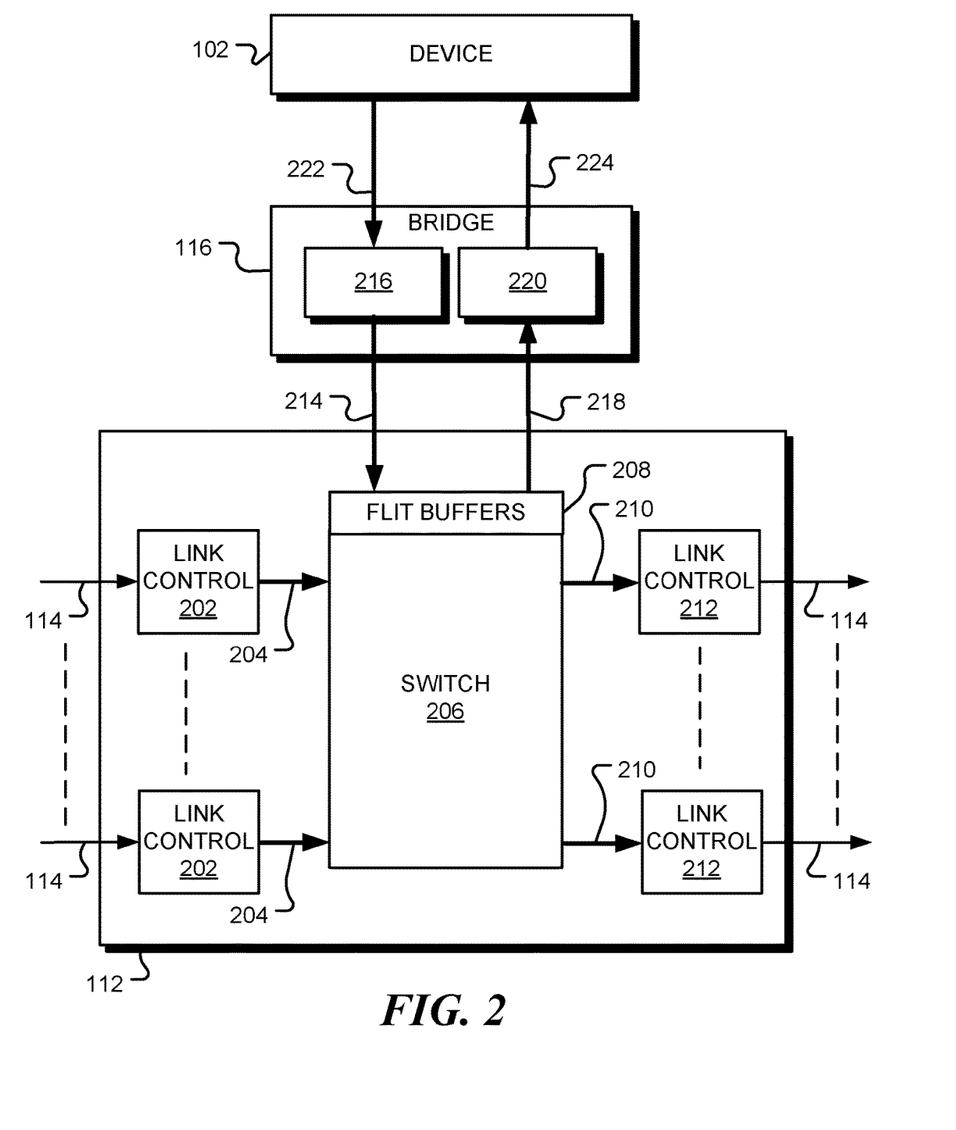
FIG. 2 is a block diagram of a bridging circuit between a device and a connection point of an interconnect circuit, in accordance with various representative embodiments.

FIG. 2 illustrates a block diagram of a bridging circuit 116 between a device 102 and a connection point 112 of an interconnect network, in accordance with various representative embodiments. In this example, the connection point 112 includes one or more link controllers 202 that receive data over data links 114 and pass flits over link 204 to switch 206. The switch 206 may utilize flit buffers 208 to store flits and provide a number of virtual data channels. The virtual channels enable multiplexing of flits through the switch. Flow control information within a flit determines if it is forwarded via link 210 to a link controller 212 to continue around the network, or whether it is passed to bridging circuit 116 to be forwarded to device 102.

Bridging circuit 116 includes a combining unit 216 and an extracting unit 220. The combining unit receives flits from device 102 and combines them into a flit having a larger width. The extract unit 220 receives larger width flits from the interconnect point 112 and extracts smaller width flits from them. In this example, the interconnect uses larger width flits than the device, but in other examples the device may use larger width flits than the interconnect.

Bridging circuit 116 may be designed in accordance with one or more interface protocols. For example, the bridging circuit may be designed in accordance with an AMBA™ (advanced microcontroller bus architecture) protocol of ARM limited, such as the AMBA5™ Coherent Hub Interface (CHI) protocol, AMBA™ ACE and AXI interfaces, or derivatives thereof. These provide an open standard, on-chip interconnect specification for the connection and management of functional blocks in a System-on-Chip (SoC) and facilitate 'right-first-time' development of multi-processor designs with multiple controllers and peripherals.

An architecture specification, such as the AMBA5™ CHI architecture for example, may specify different data channel widths and hence different flit sizes and formats. In a heterogeneous system comprising devices and interconnect of varying data widths or flit sizes, a bridging circuit may be used at the device interfaces to convert the data flits from one format to another.

Referring again to FIG. 2, bridging circuit 116 is coupled to device 102 via link 224 (that sends information from device 102 to bridge 116) and link 224 (that sends information from bridge 116 to device 102). Bridge 116 may link to other types of devices.

Figure 3:
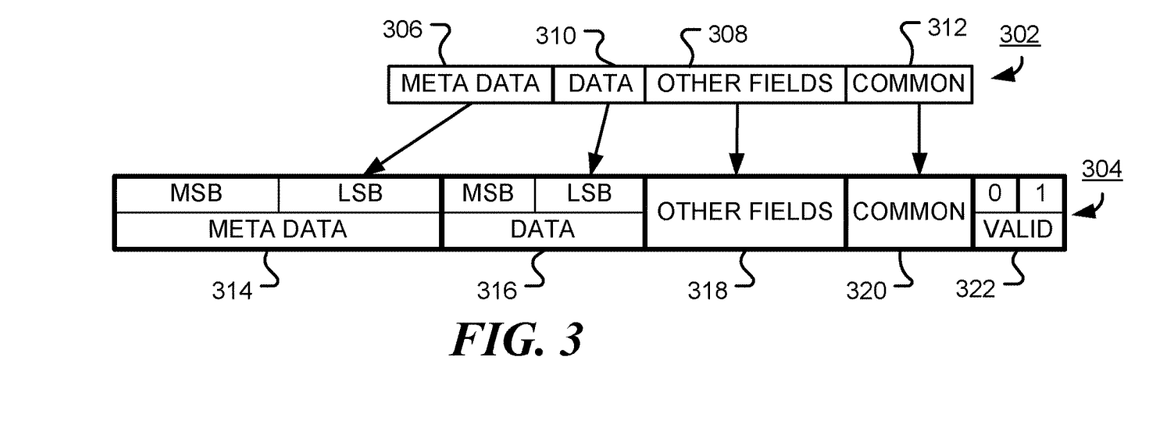
FIG. 3 illustrates an example of how a flit of one example protocol is produced from a shorter length flit of another protocol, in accordance with various representative embodiments.

FIG. 3 illustrates an example of how a flit 304 of one example protocol may be produced from a shorter length flit 302 of another protocol, in accordance with various representative embodiments. Referring to FIG. 3, shorter-width flit 302 that is structured according to a first interface protocol is moved to a larger-width flit 304 that is structured according to a second interface protocol. The first and second protocols may both be subsets of a third protocol that accommodates flits of different widths. In the simple example shown, the flit 302 includes a metadata field 306, a data field 310, a common field 312 and a number of other fields 308. The common field 312 and other fields 308 include fields relating to flow control around the network, such as identifiers of the source and destination devices and flits identifiers, for example. The metadata field 306 contains information relating to the data, such as data parity, byte enable bits, error detection codes and error correction codes, for example.

While the description below uses an example with flit widths of 128-bits and 256-bits to illustrate the details, the mechanism is applicable to other flit width combinations. In this example, the larger flit 304 contains metadata field (314) and data field (318) that are double the length of the fields in shorter flit 302. Within these fields, the bits may be designated as a chunk or slot (MSB) containing the most significant bits and a chunk or slot (LSB) containing the least bits. In one embodiment, the metadata field 306 and data field 310 from flit 302 are copied to the LSB slot of the corresponding flit 304. The other fields 308 in flit 302 may be copied to corresponding other fields 318 in larger flit 304. The common field 312 from flit 302 is copied to the common field 320 of the larger flit 304. In accordance with certain embodiments, an additional field 322 is defined in larger flit 304. This field is used to indicate which chunks or slots (MSB or LSB) of the fields contain valid information. Below, this field is referred to as the 'ChunkV' field. In the example shown in FIG. 3, only the LSB fields are valid. This information is used to determine how the flit is to be interpreted when it arrives at its destination.

Figure 4:
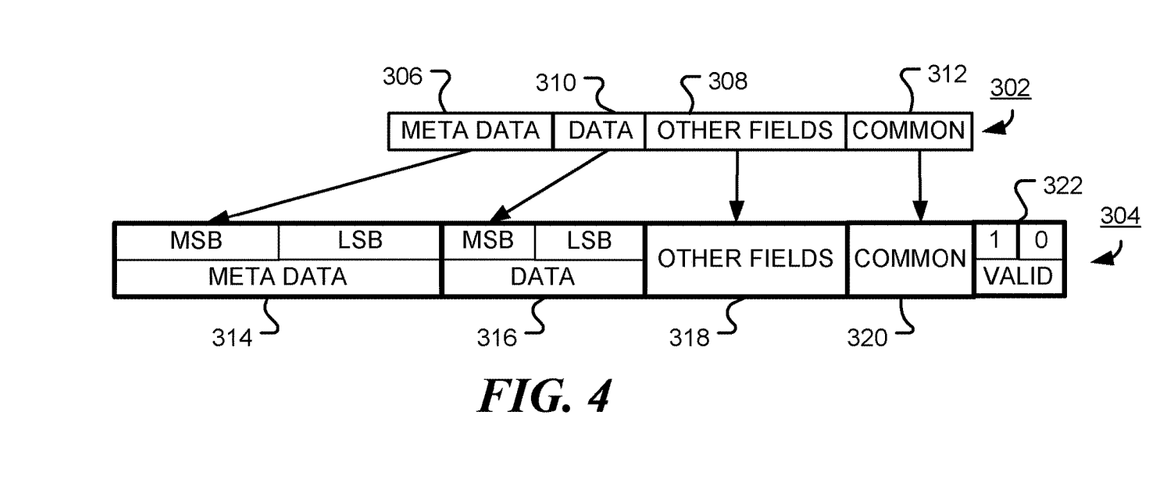
FIG. 4 illustrates a further example of how a flit of one example protocol is produced from a shorter length flit of another protocol, in accordance with various representative embodiments.

FIG. 4 illustrates a further example of how a flit 304 of one example protocol may be produced from a shorter length flit 302 of another protocol, in accordance with various representative embodiments. In this example, the data and metadata information from flit 302 is placed in the MSB fields of flit 304. The 'Chunky' field 322 indicates that only the MSB chunks are valid in this example.

The examples shown in FIG. 3 or FIG. 4 could be used to provide a simple bridging solution that uses a direct translation of data flits from one format to another at the device interface to the interconnect. However, if the device has a smaller data width than the interconnect supports, then the interconnect data bandwidth will be under-utilized.

Certain embodiments of the present disclosure relate to mechanisms for opportunistic and efficient packing and conversion of smaller data flits into the larger data flit format through judicious decode and manipulation of flit fields.

Data may be transferred across a physical link on data beats. These may correspond to clock edges, for example. In accordance with certain embodiments, 128-bit data flits that are on two or more consecutive data beats (such as beat 0 and beat 1) in a 256-bit aligned data word and destined to the same target buffer (flits that have the same target ID ('TgtID') and same transaction ID ('TxnID') Fields) are opportunistically combined into a single 256-bit data flit and uploaded to the interconnect circuit for transporting to the target buffer.

If the two 128-bit data beats cannot be combined, either because they have different targets or they are not consecutive beats in a 256-bit data word or when the second beat is not received from the device within n cycles of the first (where n can be set to any value), then each beat is sent individually, encapsulated in the larger 256-bit data flit.

Figure 5A:
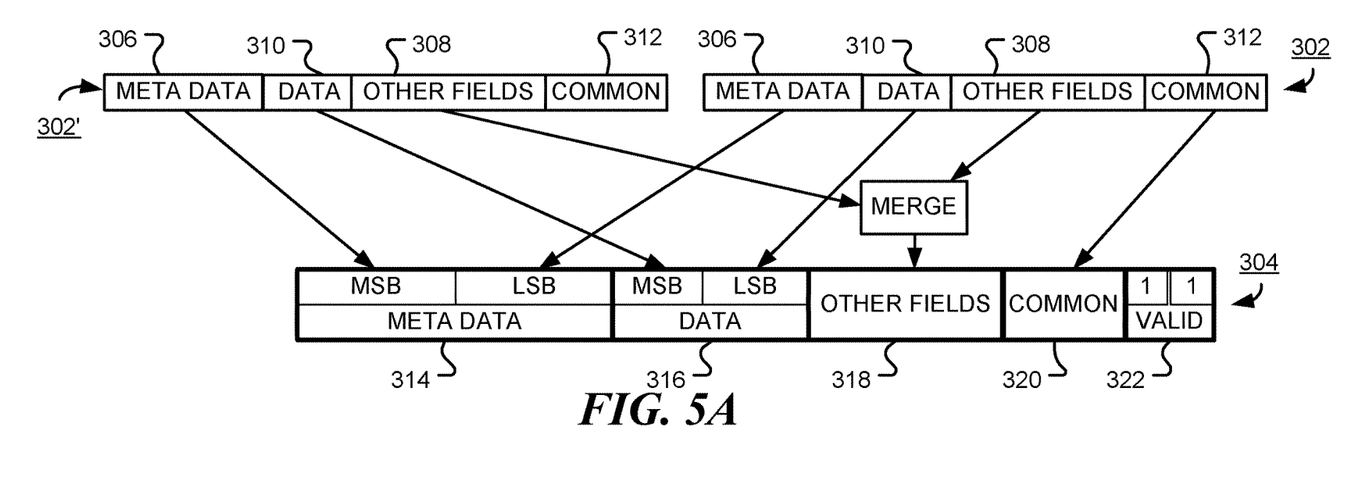
FIGS. 5A and 5B illustrate examples of how a flit of one example protocol may be produced by combining two shorter length flits of another protocol, in accordance with various representative embodiments.

FIG. 5A illustrates an example of how a flit 304 of one example protocol can be produced by combining two shorter length flits 302, 302' of another protocol, in accordance with various representative embodiments. In this example, the smaller data flits 302 and 302' are opportunistically combined wherever possible and transmitted to the destination in the larger data flit format. For example, when combining smaller data flits, specific flit fields, such as the data identifier ('DataID') and response error ('RespErr') fields in the AMBA5™ CHI protocol, are merged to make them consistent with the larger data flit format.

In FIG. 5A, two beats of 128-bit flits, 302 and 302' are combined into a single 256-bit data flit 304. The data (310) and metadata (306) fields occupy their native positions in the respective fields (316 and 314) in the 256-bit data flit 304, while the common fields 320 (which are identical in the two flits) are copied over from field 312 the beat0 128-bit data flit.

The other fields 318 in flit 304 are obtained by merging the other fields 308 from the two shorter flits. For example, error fields may be merged by performing a logical 'OR' operation between the respective fields from the two beats. Other merged fields may be an identifier ('DataID') that indicates the position of the data in a larger data structure. For example, the DataID[0] bit may be cleared and the DataID[2:1] bits copied over from beat0 when two flits are merged. In addition, information (322) is sent with the flit 304 to distinguish between coalesced and non-coalesced scenarios or to indicate which chunks or slots of the data and metadata fields are valid. In FIG. 5A, both bits of field 322 are set to indicate that both data chunks (MSB and LSB) are valid.

For example, when two smaller flits are coalesced in a larger flit, field 322 is a 2-bit identifier 322, called 'Chunky', which distinguishes the three types of data flits as shown in Table 1 below.

TABLE 1

| ChunkV [1:0] | Contents of larger flit |
| --- | --- |
| 11 | 256-bit data/metadata in their native positions |
| 01 | 128-bit data/metadata in LSB positions |
| 10 | 128-bit data/metadata in MSB positions |
| 00 | Undefined |

While the example above uses 128-bit and 256-bit flits, other size flits may be combined. For example, four 64-bit flits could be combined into a 256-bit flit, or four 32-bit flits combined into a 128-bit flit.

The combining of flits has been described above, however, the process may be reversed when a larger flit is to be sent to a device that uses a protocol with shorter flits. For example, on downloading a 256-bit data flit from the interconnect, the ChunkV field (322) is decoded and the flit is split into one or two 128-bit data beats and transferred to the device in critical chunk order. The DataID[0] field is set to 1 when beat 1 is sent, while all other fields are copied over from the original 256-bit data flit.

Figure 5B:
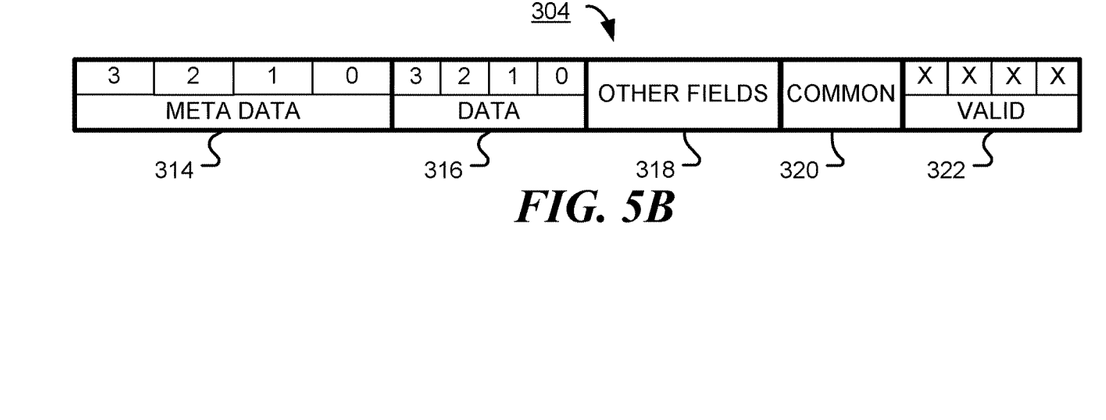

FIG. 5B illustrates an example of how a flit of one example protocol may be produced from four shorter length flits of another protocol, in accordance with various representative embodiments. In this example, the metadata (314) and data (316) fields of flit 304 have four chunks or slots, each slot sized to contain a corresponding field from a shorter flit of the other protocol. In addition, the ChunkV or validity field 322 contains 4-bits, one for each of the chunks or slots in the data field 316 and metadata field 314.

Data transfer bandwidth across the interconnect may be a bottleneck in a high performance system. The mechanism described above enables efficient use of the available bandwidth in the system by judiciously combining smaller data flits into larger ones. This may provide a data transfer bandwidth improvement of up to two times.

In the absence of a mechanism such as the one described above, a typical way to support 128-bit flits would be encapsulate the smaller flit into the larger 256-bit flit format and send one flit at a time, as shown in FIGS. 3 and 4 for example.

Figure 6:
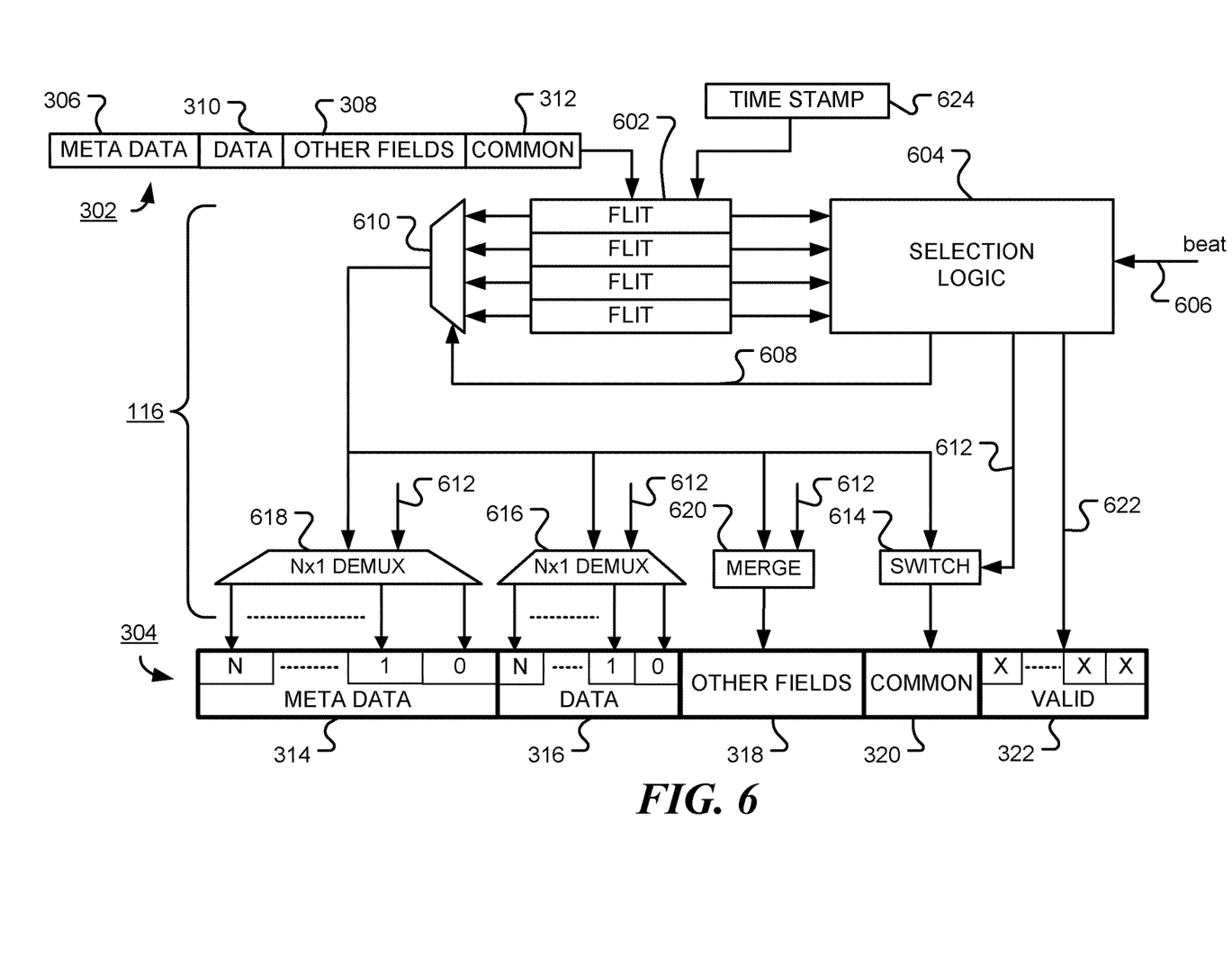
FIG. 6 is a block diagram of a bridging circuit for producing a flit of one example protocol from two shorter length flits of another protocol, in accordance with various representative embodiments.

FIG. 6 is a block diagram of a bridging circuit 116 for producing a flit 304 of one example protocol from shorter length flits 302 of another protocol, in accordance with various representative embodiments. Referring to FIG. 6, incoming shorter flits 302 are placed in a flit buffer 602. Selection logic 604, which may be responsive to a beat signal 606, determines if two or more flits stored in the buffer 602 may be combined into a longer flit 304. If the flits can be combined, selection logic 604 controls multiplexer 610, via link 608, to output the flits to be combined. Selection logic 604 also provides an output 612 to switch 614, multiplexers 616 and 618, and merge logic 620 and controls allocation of the shorter flits 302 into the longer flit 304. Data 310 from the shorter flits are multiplexed by multiplexer 616 into slots of data field 316 of the longer flit. In this example, N shorter flits are combined into a single longer flit, where N is an integer greater than one. The shorter flit contains metadata 306. The metadata 306 provides information relating to the data 310, such as data parity, error detection codes, error correction codes, and byte enable codes for example. The metadata 306 are multiplexed by multiplexer 618 into metadata field 314 of the longer flit. The shorter flits may contain common fields 312, which are the same in each of the flits. One common field is selected by switch 614 and stored in the common field 320 of the longer flit. Other fields 308 may be merged into other field 318 of the longer flit by merge logic 620. For example, error fields in the shorter flits may be combined using a logical OR operation to indicate if an error has occurred in any of the shorter flits. Selection logic 604 is also coupled to validity field 322 of the longer flit 304. The validity field 322 may contain N-bits to indicate which slots of the longer byte contain valid data and metadata. When filled, the longer flit 304 may be transmitted. The longer flit may also be transmitted when only partially filled to enable the transmission of flits that cannot be combined. The bridging circuit 116 may also include time stamp logic 624 operable to apply a time stamp to flits stored in flit buffer 602.

Figure 7:
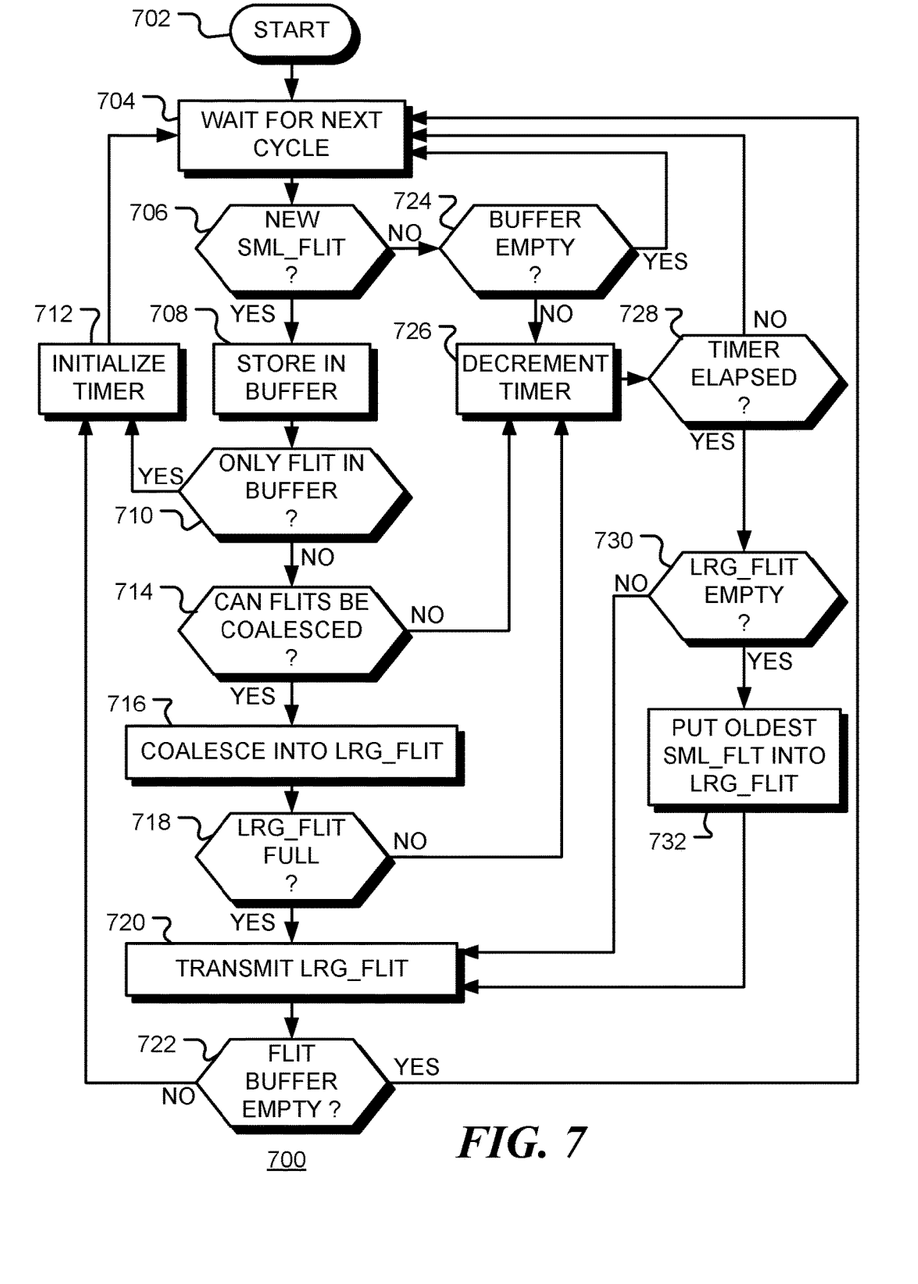
FIG. 7 is a flow chart of a method for producing a flit of one example protocol from two shorter length flits of another protocol, in accordance with various representative embodiments.

FIG. 7 is a flow chart 700 of a method for producing a flit of one example protocol from two shorter length flits of another protocol, in accordance with various representative embodiments. The process may be controlled by cycles of a clock or beats. Following start block 702, the system waits for the next cycle at block 704. If a new flit is received, as depicted by the positive branch from decision block 706, the new flit is stored in a flit buffer at block 708. If the new flit is the only flit in the buffer, as depicted by the positive branch from decision block 710, a timer is initialized at block 712 and flow returns to block 704. If the new flit is not the only flit in the buffer, as depicted by the negative branch from decision block 710 a determination is made at decision block 714 to determine if the flits in the buffer can be coalesced into a larger flit. If the flits can be coalesced, as depicted by the positive branch from decision block 714, the flits are removed from the buffer and coalesced in a larger flit at block 716. If the larger flit is then full, as depicted by the positive branch from decision block 718, the larger flit is transmitted at block 720. If the flit buffer is empty, as depicted by the positive branch from decision block 722, flow returns to block 704, otherwise the timer is re-initialized at block 712.

If no new flit is received, as depicted by the negative branch from decision block 706, flow continues to decision block 724. If the buffer is empty, as depicted by the positive branch from decision block 724, flow continues to block 704, otherwise the timer is decremented at block 726. The timer is also decremented if the flits in the buffer cannot be coalesced, as depicted by the negative branch from decision block 714, or if the larger flit is not full, as depicted by the negative branch from decision block 718. If the timer has not elapsed, as depicted by the negative branch from decision block 728, flow returns to block 704. Otherwise, as depicted by the positive branch from decision block 718, flow continues to decision block 730. If the larger flit is empty, the oldest smaller flit in the flit buffer is placed into the larger flit and the larger flit is transmitted at block 720. Otherwise, the partially filled larger flit is transmitted at block 720.

In accordance with certain embodiments of the present disclosure, there is provided a method of operation of a bridging circuit coupled between a first electronic circuit and second electronic circuit, where the first electronic circuit generates signals corresponding to digits of a flow control unit (flit) of a first flow control protocol and where the second electronic circuit transports signals corresponding to digits of a flow control unit (flit) of a second flow control protocol, the method comprising: when first flits received from the first electronic circuit are to be transported by the second electronic circuit to the same target buffer:

combining the first flits to form a second flit consistent with the second flow control protocol; and transmitting the second flit to the second electronic circuit, where the second flit is structured according to the second flow control protocol and comprises:

a data field containing data fields copied from the first flits;

a metadata field containing metadata fields copied from the first flits;

a common field containing a field that is common to each of the first flits;

a merged field containing a merger of fields from the first flits; and a validity field indicating which portions of the second flit contain valid data.

In accordance with certain other embodiments of the present disclosure, there is provided a method of operation of a bridging circuit coupled between a first electronic circuit and second electronic circuit, where the first electronic circuit generates signals corresponding to digits of a flow control unit (flit) of a first flow control protocol and where the second electronic circuit is responsive to signals corresponding to digits of a flow control unit (flit) of a second flow control protocol, the method comprising, in response to a second flit received from the second electronic circuit:

for each valid chunk of a second flit of the second protocol, the second flit comprising a data field comprising a plurality of chunks and a metadata field comprising a plurality of chunks, forming a first flit of the first protocol, the first flit comprising:
  a data field copied from the valid chunk of the data field of the second flit;
  a metadata field copied from the valid chunk of a metadata field of the second flit;
  a common field copied from a common field of the second flit;
  a merged field derived from a merged field of the second flit and,
  transmitting the first flit to the first electronic circuit.

The various apparatus and devices described herein provide a data processing system comprising a bridging circuit for coupling between a first electronic circuit and second electronic circuit, where the first electronic circuit generates signals corresponding to digits of a flow control unit (flit) of a first flow control protocol and where the second electronic circuit is responsive to signals corresponding to digits of a flow control unit (flit) of a second flow control protocol, the bridging circuit comprising:

a first multiplexer that receives a data field of a first flit of the first protocol and couples the data field to a chunk of a plurality of chunks of a data field of a second flit of the second protocol, where the width of the data field chunk matches the width of the data field of the first flit;

a second multiplexer that receives a metadata field of the first flit and couples the metadata field to a chunk of a plurality of chunks of a metadata field of the second flit, where the width of the metadata field chunk matches the width of the metadata field of the first flit;

a switch that is operable to couple a common field of the first flit to a common field of the second flit;

merge logic operable to merge fields of a plurality of first flits to form a merge field of the second flit; and a validity field indicative of which chunks of the plurality of chunks of the data field of the second flit contain valid data.

It will be appreciated that some or all functions described herein could be implemented by custom logic, such a state machine, that has no stored program instructions, in one or more application specific integrated circuits (ASICs), in reconfigurable logic such as an FPGA, or in one or more programmed processors having stored instructions. Of course, a combination of these approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such integrated circuits, software instructions and programs with minimal experimentation.

As used herein, the term processor, controller or the like may encompass a processor, controller, microcontroller unit (MCU), microprocessor, graphics processing unit (GPU), a digital signal processor (DSP), a field programmable gate array (FPGA), an application specific integrated circuit (ASIC) device, a memory controller or an I/O master device.

Those skilled in the art will recognize that the present disclosure has been described in terms of exemplary embodiments, but it not so limited. The present disclosure could be implemented using hardware components, such as special purpose hardware and/or dedicated processors which are equivalents to the disclosure as described and claimed. Similarly, general purpose computers, microprocessor based computers, micro-controllers, optical computers, analog computers, dedicated processors and/or dedicated hard wired logic may be used to construct alternative equivalent embodiments of the present disclosure.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present disclosure. For example, the order of certain operations carried out can often be varied, additional operations can be added or operations can be deleted without departing from the disclosure. Error trapping can be added and/or enhanced and variations can be made in user interface and information presentation without departing from the present disclosure. Such variations are contemplated and considered equivalent.

Accordingly, some aspects and features of the disclosed embodiments are set out in the following numbered items:

1. A method of operation of a bridging circuit coupled between a first electronic circuit and second electronic circuit, where the first electronic circuit generates signals corresponding to digits of a flow control unit (flit) of a first flow control protocol and where the second electronic circuit transports signals corresponding to digits of a flow control unit (flit) of a second flow control protocol, the method comprising:

when first flits received from the first electronic circuit are to be transported by the second electronic circuit to the same target buffer:

combining the first flits to form a second flit consistent with the second flow control protocol; and transmitting the second flit to the second electronic circuit, where the second flit is structured according to the second flow control protocol and comprises:

a data field containing data fields copied from the first flits;

a metadata field containing metadata fields copied from the first flits;

a common field containing a field that is common to each of the first flits;

a merged field containing a merger of fields from the first flits; and a validity field indicating which portions of the second flit contain valid data.

2. The method of item 1, where the merged field of the second flit comprises a data identifier field indicative of the position of the data field of the second flit within a larger data field; and an error field indicative of an error in any of the first flits;

3. The method of item 1, where the common field of the second flit comprises an identifier of a source of the first flits; and an identifier of a target of the first flits.

4. The method of item 1, further comprising determining when the first flits received on two or more consecutive data beats from the first electronic circuit and are destined for the same target buffer.

5. The method of item 1, further comprising:

storing the first flits in a flit buffer;

selecting, from the flit buffer, two or more first flits that can be combined to form a second flit consistent with the second flow control protocol; and combining the two or more selected first flits to form the second flit.

6. The method of item 5, further comprising, when a time for which a flit of the first flits stored in the flit buffer exceeds a threshold,
generating, from the first flits, a second flit consistent with the second flow control protocol; and
transmitting the second flit to the second electronic circuit.

7. The method of item 1, wherein the data field of the second flit is twice the length of a data field of a first flit.

8. The method of item 1, wherein the data field of the second flit is four times the length of a data field of a first flit.

9. The method of item 1, wherein at least one of the first flits and the second flit comprises a component of an information packet.

10. A method of operation of a bridging circuit coupled between a first electronic circuit and second electronic circuit, where the first electronic circuit generates signals corresponding to digits of a flow control unit (flit) of a first flow control protocol and where the second electronic circuit is responsive to signals corresponding to digits of a flow control unit (flit) of a second flow control protocol, the method comprising, in response to a second flit received from the second electronic circuit:
for each valid chunk of a second flit of the second protocol, the second flit comprising a data field comprising a plurality of chunks and a metadata field comprising a plurality of chunks, forming a first flit of the first protocol, the first flit comprising:
a data field copied from the valid chunk of the data field of the second flit;
a metadata field copied from the valid chunk of a metadata field of the second flit;
a common field copied from a common field of the second flit;
a merged field derived from a merged field of the second flit and,
transmitting the first flit to the first electronic circuit.

11. The method of item 10, where forming the merged field of the first flit comprises: determining a data identifier dependent upon a data identifier in the second flit and a position of the valid chunk of the data field within the plurality of chunks of the data field of the second flit.

12. The method of item 10, where at least one of the first and second flits comprises a component of an information packet.

13. A data processing system comprising a bridging circuit for coupling between a first electronic circuit and second electronic circuit, where the first electronic circuit generates signals corresponding to digits of a flow control unit (flit) of a first flow control protocol and where the second electronic circuit is responsive to signals corresponding to digits of a flow control unit (flit) of a second flow control protocol, the bridging circuit comprising:
a first multiplexer that receives a data field of a first flit of the first protocol and couples the data field to a chunk of a plurality of chunks of a data field of a second flit of the second protocol, where the width of the data field chunk matches the width of the data field of the first flit;
a second multiplexer that receives a metadata field of the first flit and couples the metadata field to a chunk of a plurality of chunks of a metadata field of the second flit, where the width of the metadata field chunk matches the width of the metadata field of the first flit;
a switch that is operable to couple a common field of the first flit to a common field of the second flit;
merge logic operable to merge fields of a plurality of first flits to form a merge field of the second flit; and a validity field indicative of which chunks of the plurality of chunks of the data field of the second flit contain valid data.

14. The data processing system of item 13, where the bridging circuit further comprises:
a flit buffer operable to store the plurality of first flits;
selection logic operable to determine, from the plurality of first flits stored in the flit buffer, two or more first flits to be combined; and
a multiplexer operable to select the two or more first flits to be combined.

15. The data processing system of item 14, where the bridging circuit further comprises:
time stamp logic operable to associate a time stamp with each flit stored in the flit buffer; where the selection logic is responsive to the time stamps to limit the time any flit is stored in the flit buffer.

16. The data processing system of item 13, where the bridging circuit couples to the first integrated circuit via a first physical link and to the second integrated circuit via second physical link, where the width of the first physical link matches the length of the first flit and where the width of the second physical link matches the length of the second flit.

17. The data processing system of item 13, where the bridging circuit couples to the first integrated circuit via a first physical link and to the second integrated circuit via second physical link, where the length of the first flit is an integer multiple of the width of the first physical link and where the length of the second flit is an integer multiple of the width of the second physical link.

18. The data processing system of item 13, further comprising:
the first electronic circuit;
the second electronic circuit; and
a data resource,
where the first electronic circuit comprises one or more processors and where the second electronic circuit comprises an interconnect circuit that couples between the one or more processors and the data resource via the bridging circuit.

19. The data processing system of item 13, further comprising:
the first electronic circuit;
the second electronic circuit; and
a data resource,
where the second electronic circuit comprises one or more processors and where the first electronic circuit comprises an interconnect circuit that couples between the one or more processors and the data resource via the bridging circuit.

20. The data processing system of item 13, further comprising:
the first electronic circuit;
the second electronic circuit; and
one or more processors,
where the first electronic circuit comprises a data resource and where the second electronic circuit comprises an interconnect circuit that couples between the one or more processors and the data resource via the bridging circuit.

21. A non-transitory computer readable medium storing instructions of a hardware description language that described the date processing system of item 13.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for increasing bandwidth of an interconnect circuit of a network by operation of a bridging circuit coupled between a first device of the network and the interconnect circuit, where the first device generates signals corresponding to digits of a flow control unit (flit) of a first flow control protocol and where the interconnect circuit transports signals corresponding to digits of a flow control unit (flit) of a second flow control protocol from the first device to a second device of the network via one or more buffers of the interconnect, the method comprising:
   receiving two or more first flits from the first device at the bridging circuit;
   when the two or more first flits received from the first device are to be transported by the interconnect circuit to the same target buffer of the one or more buffers:
      combining the two or more first flits to form a single second flit consistent with the second flow control protocol; and
      transmitting the single second flit from the bridging circuit to the second device via the target buffer of the interconnect circuit, whereby the number of flits transmitted through the interconnect circuit is reduced by a factor of two or more and the bandwidth of the interconnect circuit is increased,
where each flit of the two or more first flit comprises a data field, a metadata field, a common field and at least one other field, and
where combining the two or more first flits to form a single second flit comprises:
   copying data fields from the two or more first flits to a data field of the second flit;
   coping metadata fields from the two or more first flits to a metadata field of the second flit;
   copying a common field from one of the two or more first flits to a common field of the second flit;
   merging the at least one other fields of the two or more first flits to form a merged field of the second flit; and
   generating a validity field of the second flit indicating which portions of the second flit contain valid data.

2. The method of claim 1, where the merged field of the second flit comprises a data identifier field indicative of the position of the data field of the second flit within a larger data field; and an error field indicative of an error in any of the first flits.

3. The method of claim 1, where the common field of the second flit comprises an identifier of a source of the first flits; and an identifier of a target of the first flits.

4. The method of claim 1, where the first flits are received on a physical link from the first device of the network on two or more data beats, and where combining the first flits to form a second flit consistent with the second flow control protocol is performed when the first flits are received on two or more consecutive data beats from the first device of the network and are destined for the same target buffer.

5. The method of claim 1, further comprising:
   storing the first flits in a flit buffer;
   selecting, from the flit buffer, two or more first flits that can be combined to form a second flit consistent with the second flow control protocol; and
   combining the two or more selected first flits to form the second flit.

6. The method of claim 5, further comprising, when a time for which a flit of the first flits stored in the flit buffer exceeds a threshold,
   generating, from the first flits, a second flit consistent with the second flow control protocol; and
   transmitting the second flit to the second device of the network.

7. The method of claim 1, wherein the data field of the second flit is twice the length of a data field of a first flit.

8. The method of claim 1, wherein the data field of the second flit is four times the length of a data field of a first flit.

9. The method of claim 1, wherein at least one of the first flits and the second flit comprises a component of an information packet.

10. The method of claim 1, further comprising:
    receiving, by the bridging circuit, a third flit, consistent with the second flow control protocol, from the interconnect circuit, the third flit comprising a data field containing a plurality of data chunks and a metadata field containing a plurality of metadata chunks:
    identifying valid data chunks of the plurality of data chunks of the third second flit from data in a validity field of the second flit;
    for each valid data chunk of the third flit of the second protocol,
       forming a fourth flit consistent with the first protocol, the fourth flit comprising:
          a data field containing a data chunk copied from a corresponding valid data chunk of the data field of the third flit;
          a metadata field containing a metadata chink copied from a corresponding valid metadata chunk of the metadata field of the third flit;
          a common field containing data copied from a common field of the third flit; and
          a merged field containing data derived from a merged field of the third flit and,
    transmitting the fourth flit to the first electronic device.

11. The method of claim 10, where forming the merged field of the fourth flit comprises:
    determining a data identifier dependent upon a data identifier in the third flit and a position of the valid data chunk within the data field of the third flit.

12. The method of claim 10, where at least one of the fourth and third flits comprises a component of an information packet.

13. A data processing network comprising an interconnect circuit and a bridging circuit for coupling between a first device of the network and the interconnect circuit, where the first device generates signals corresponding to digits of a flow control unit (flit) of a first flow control protocol and where the interconnect circuit is operable to transport signals corresponding to digits of a flow control unit (flit) of a second flow control protocol to a second device of the network, the bridging circuit comprising:
    a flit buffer operable to store a plurality of first flits of the first flow control protocol received from the first device;
    selection logic operable to determine, from the plurality of first flits stored in the flit buffer, two or more first flits to be combined;
    a first multiplexer operable to select, in turn, each of the two or more first flits to be combined;
    a second multiplexer that receives a data field of the selected first flit of the first flits to be combined and couples the data field to a chunk of a plurality of chunks of a data field of a second flit of the second protocol, where the width of the data field chunk matches the width of the data field of the selected first flit;

a third multiplexer that receives a metadata field of the selected first flit and couples the metadata field to a chunk of a plurality of chunks of a metadata field of the second flit, where the width of the metadata field chunk matches the width of the metadata field of the selected first flit;

a switch that is operable to couple a common field of the first flit to a common field of the second flit; and merge logic operable to merge fields of a plurality of first flits to form a merge field of the second flit, where the select logic is configured to write in the second flit a validity field indicative of which chunks of the plurality of chunks of the data field of the second flit contain valid data, and where the bridging circuit is further configured to transmit the second flit to the interconnect circuit for transmission to the second device, such that the number of second flits transmitted through the interconnect circuit is smaller than the number of first flits received by the bridging circuit from the first device and the bandwidth of the interconnect circuit is increased.

14. The data processing system of claim 13, where the bridging circuit further comprises:

time stamp logic operable to associate a time stamp with each flit stored in the flit buffer;

where the selection logic is responsive to the time stamps to limit the time any flit is stored in the flit buffer.

15. The data processing system of claim 13, where the bridging circuit couples to the first device via a first physical link and to the interconnect circuit via second physical link, where the width of the first physical link matches the length of the first flit and where the width of the second physical link matches the length of the second flit.

16. The data processing system of claim 13, where the bridging circuit couples to the first device via a first physical link and to the interconnect circuit via second physical link, where the length of the first flit is an integer multiple of the width of the first physical link and where the length of the second flit is an integer multiple of the width of the second physical link.

17. The data processing system of claim 13, further comprising:

the first device; and a data resource, where the first device comprises one or more processors and where the interconnect circuit couples between the one or more processors and the data resource via the bridging circuit.

18. The data processing system of claim 13, further comprising:

the first device; and a data resource, where the second device comprises one or more processors and where the interconnect circuit couples between the one or more processors and the data resource via the bridging circuit.

19. The data processing system of claim 13, further comprising:

the first device; and one or more processors, where the first device comprises a data resource and where the interconnect circuit couples between the one or more processors and the data resource via the bridging circuit.

20. A non-transitory computer readable medium storing instructions of a hardware description language that described the date processing system of claim 13.

* * * * *